US007715554B1

(12) United States Patent
Lepe

(10) Patent No.: US 7,715,554 B1
(45) Date of Patent: May 11, 2010

(54) PRIME NUMBER DETERMINING METHOD

(76) Inventor: Henry Lepe, 1023 N. St. Paul, Wichita, KS (US) 67203

( * ) Notice: Subject to any disclaimer, the term of this patent is extended or adjusted under 35 U.S.C. 154(b) by 1097 days.

(21) Appl. No.: 11/373,034

(22) Filed: Mar. 10, 2006

(51) Int. Cl.
*H04L 9/00* (2006.01)

(52) U.S. Cl. .............................. 380/30; 380/56; 380/57; 380/58; 708/490; 708/491; 708/492

(58) Field of Classification Search ................... 380/28, 380/56–58; 708/490–492
See application file for complete search history.

(56) References Cited

FOREIGN PATENT DOCUMENTS

BE   1016982 A6 * 11/2007
WO   WO2006020238 A2 * 2/2006

* cited by examiner

*Primary Examiner*—Taghi T Arani
*Assistant Examiner*—Josnel Jeudy

(74) *Attorney, Agent, or Firm*—Kenneth H. Jack; Davis & Jack, L.L.C.

(57) ABSTRACT

A method for determining, for use in ciphers, all of the prime numbers within the large numeric series: 5, 6, 7, 8, 9, 10, 11, 12, . . . , n, the method including steps of setting $n'=\lceil n/6 \rceil$; establishing the small numeric series, $6(1)-1, 6(1)+1, 6(2)-1, 6(2)+1, 6(3)-1, 6(3)+1, \ldots 6(n')-1, 6(n')+1$, each member of the small numeric series being initially unlabeled, the small numeric series consisting of a "$-1$" subseries and a "$+1$" subseries; while $\beta-((\beta+1)/6)$ is less than n', repeating substeps of First, setting $\beta$ to equal the least unlabeled member of the "$-1$" subseries, labeling that member as "prime", labeling as "non-prime" every $\beta^{th}$ member thereafter of the "$-1$" subseries, labeling as "non-prime" the $(\beta-((\beta+1)/6))^{th}$ member of the "$+1$" subseries, labeling as "non-prime" every $\beta^{th}$ member thereafter of the "$+1$" subseries, and Second, setting $\beta$ to equal the least unlabeled member of the "$+1$" subseries, labeling that member as "prime", labeling as "non-prime" every $\beta^{th}$ member thereafter of the "$+1$" subseries, labeling as "non-prime" the $(\beta-((\beta-1)/6))^{th}$ member of the "$-1$" subseries, and labeling as "non-prime" every $\beta^{th}$ member thereafter of the "$-1$" subseries; and labeling as "prime" each unlabeled member of the small numeric series.

2 Claims, 2 Drawing Sheets

$$\{\, 6(1)-1,\, 6(1)+1,\, 6(2)-1,\, 6(2)+1,\, 6(3)-1,\, 6(3)+1,\, \ldots,\, 6(n')-1,\, 6(n')+1 \,\}$$

Fig. 1

$$\{\,5, 6, 7, 8, 9, 10, 11, 12, \ldots, n\,\}$$

Fig. 2

$$\{\,6(1)-1, 6(1)+1, 6(2)-1, 6(2)+1, 6(3)-1,$$
$$6(3)+1, \ldots, 6(n')-1, 6(n')+1\,\}$$

Fig. 3

$$\{\,6(1)-1, 6(2)-1, 6(3)-1, \ldots, 6(n')-1\,\}$$

Fig. 4

$$\{\,6(1)+1, 6(2)+1, 6(3)+1, \ldots, 6(n')+1\,\}$$

Fig. 5

```
pgm
n ← 1
While n < 10^B Do
        X(n) ← 6(n) - 1
        Y(n) ← 6(n) + 1
        n ← n + 1
End while
t_x ← 1
t_y ← 1
Cutoff ← Int (√(10^B) + 1)
X_L ← X(1)
Y_L ← Y(1)
While (X_L ≤ Cutoff) and (Y_L ≤ Cutoff) Do
    If X_L ≤ Y_L Then
        Print X_L, 'is prime'
        j ← 0
        While j ≤ 10^B Do
            X((X_L + 1)/6 + j · X_L) ← 6(10^(2*B)) + 1
            Y(X_L - (X_L + 1)/6 + j · X_L) ← 6(10^(2*B)) + 1
            j ← j+1
        Endwhile
    Else
        Print Y_L, 'is prime'
        j ← 0
        While j ≤ 10^B Do
            Y((Y_L - 1)/6 + j · Y_L) ← 6(10^(2*B)) + 1
            X(Y_L - (Y_L - 1)/6 + j·Y_L) ← 6(10^(2*B)) + 1
            j ← j+1
        Endwhile
    Endif
    While X(t_x) ≥ 10^(2*B) Do
        t_x ← t_x + 1
    Endwhile
        X_L ← X(t_x)
    While Y(t_y) ≥ 10^(2*B) Do
        t_y ← t_y + 1
    Endwhile
        Y_L ← Y(t_y)
Endwhile
While t_x < 10^B Do
    If X(t_x) > 10^(2*B) then
        t_x ← t_x + 1
    Else
        Print X(t_x), 'is prime'
        t_x ← t_x + 1
    Endif
Endwhile
While t_y < 10^B Do
    If Y(t_y) > 10^(2*B) then
        t_y ← t_y + 1
    Else
        Print Y(t_y), 'is prime'
        t_y ← t_y + 1
    Endif
Endwhile
Endpgm
```

PRIME NUMBER DETERMINING METHOD

FIELD OF THE INVENTION

This invention relates to computer performable methods for generation of prime numbers for use in cyphering, encryption, and de-encryption processes.

BACKGROUND OF THE INVENTION

It is commonly known that computerized encryption and de-encryption programs and processes are dependent upon utilization and availability of large prime numbers. Accordingly, methods and processes which determine and display large prime numbers desirably assist in message encryption and de-encryption. Such large prime numbers may appropriately be viewed as "raw material" which is processed in the message encryption and de-encryption arts.

Commonly known methods and processes for generating large prime numbers undesirably require a large amount of computer capacity and computer processing time.

The instant inventive prime number generating method solves or ameliorates problems discussed above by providing a method for determining large prime numbers, which method utilizes a relatively small amount of computer power and computing processing time.

BRIEF SUMMARY OF THE INVENTION

The Sieve of Eratosthenes prescribes a method for determining prime numbers. Such sieve is operable upon the following series of positive integers:

$\{2, 3, 4, 5, \ldots, n\}$.

In utilizing the Sieve of Eratosthenes, "n" typically represents a large positive integer which is known to be larger than the largest prime number which is sought to be determined. According to the method of the Sieve of Eratosthenes, each integer member of the above series is initially unlabeled. In the first step of the method, the least unlabeled member of the series (i.e., 2) is labeled as "prime" and each whole multiple of such prime thereafter within the series is labeled as "non-prime". The steps of labeling the least unlabeled member as "prime" and labeling subsequent multiples of that least member as "non-prime" may be terminated when the least unlabeled member of the series is greater than $\lfloor \sqrt{n} \rfloor$ (i.e., the lower delimited whole number portion of $\sqrt{n}$). At that point, each remaining unlabeled member of the series may be accurately labeled as "prime". All prime numbers less than or equal to "n" are generated by the method of the Sieve of Eratosthenes. An advantage of the Sieve of Eratosthenes is that its method identifies the prime or non-prime character each number member of the series solely by virtue of member's position within the series, and without any analysis or calculation steps directed to the number member itself.

A problem or disadvantage of the method of the Sieve of Eratosthenes is that the numeric series upon which the method operates often is inordinately large, taking an inordinate amount of computer processing time to completely perform the method. Where the instant inventive prime number generating method is applied to determine all prime numbers less than or equal to the same large positive integer "n", the numeric series to which the inventive method applies is approximately ⅓ of the size of the number series utilized by the Sieve of Eratosthenes. The instant inventive method operates similarly with that of the Sieve of Eratosthenes in that the prime or non-prime character of each number member is determined by virtue of the number's position within the series without any analysis or calculations directed to the number itself.

By eliminating approximately ⅔ of the number member's dealt with in the Sieve of Eratosthenes method, the instant inventive method beneficially and advantageously saves computer processing time in the determination of prime numbers for use in cyphering, encryption, and de-encryption methods and processes. The inventive method allows high powered computers to determine a higher prime number output.

Accordingly, an object of the instant invention is to provide a method for determining prime numbers which saves computer processing time through the method's ability to utilize and operate upon a relatively small numeric series.

Other and further objects, benefits, and advantages will become known to those skilled in the art upon review of the Detailed Description which follows, and upon review of the appended drawings.

BRIEF DESCRIPTION OF THE DRAWINGS

FIG. 1 represents an exemplary large numeric series which contains all of the prime numbers which are to be determined by the instant inventive method.

FIG. 2 represents a small numeric series to which the instant inventive method may be applied, the small numeric series being derivative of large numeric series of FIG. 1.

FIG. 3 represents a "-1" subseries component of the small numeric series of FIG. 2.

FIG. 4 represents a "+1" subseries component of the small numeric series of FIG. 2.

FIG. 5 presents a simple exemplary computer program for facilitating machine execution of the steps of the instant inventive method.

DETAILED DESCRIPTION OF A PREFERRED EMBODIMENT

Referring now to the drawings, and in particular to FIG. 1, a preferred first step in the performance of the instant inventive prime number determining method comprises selecting a positive integer n such that the value of n is greater in magnitude than that of the largest prime integer which is sought to be determined. Where the instant method is to be executed via high speed computer, a very large value of n may be advantageously selected.

Upon selecting such integer n, it can be seen, referring to the large numeric series represented in FIG. 1, that the large numeric series has n−4 members. Where computer applications directed to number series of such size and magnitude result in excessive use of computer processing time, alternate application of the instant inventive method is particularly advantageous.

A preferred next step in performing the instant inventive method is to set an n' such that n'≈⌈n/6⌉ (i.e., the number which is the upper-delimited whole integer value of ⅙th of n). The relatively small size of n forms a basis for savings in computer processing time.

A preferred next succeeding step in performance of the instant inventive method is establishment of a small numeric series based upon n', such series being represented in FIG. 2. Users of the instant inventive method may correctly recognize that every prime number other than 1, 2, and 3 will, upon either adding 1 thereto or subtracting 1 therefrom, be evenly divisible by six. Accordingly, the small numeric series depicted in FIG. 2 includes all of the prime numbers between 5 and 6n'+1. It follows that such small numeric series may be correctly recognized as including each and every prime number member of the large numeric series represented in FIG. 1.

Upon establishment of the small numeric series represented in FIG. 2, users of the inventive method will preferably recognize that such small numeric series consists of a combination of a "−1" subseries as represented in FIG. 3 and a "+1" subseries as represented in FIG. 4.

Upon establishing the "−1" and "+1" subseries components, as represented in FIGS. 3 and 4, all of the members of those subseries are unlabeled (i.e., no "prime" or "non-prime" labeling of any of the members has occurred.) Users of the inventive method preferably initially set or designate a positive integer as β, such integer β being equal to the least labeled member of the "−1" subseries. Thereafter, such user preferably labels that least unlabeled member as "prime", and the user proceeds to label as "non-prime" every $\beta^{th}$ member thereafter of the "−1" subseries. Thereafter, the user preferably similarly labels as "non-prime" the $(\beta-((\beta+1)/6))^{th}$ member of the "+1" subseries, and proceeds to label as "non-prime" every $\beta^{th}$ member thereafter of the "+1" subseries.

Thereafter, alternating attention to the "+1" subseries, the user of the instant inventive method preferably re-designates another integer as a β, newly designated β equaling the least unlabeled member of the "+1" subseries and labels that member as "prime". Then, the user preferably proceeds to label as "non-prime" every βth member thereafter of the "+1" subseries. Thereafter, the user preferably similarly labels as "non-prime" the $(\beta-((\beta+1)/6))^{th}$ member of the "−1" subseries, and proceeds to label as "non-prime" every $\beta^{th}$ member thereafter of the "−1" subseries.

Thereafter, in a reciprocating fashion, β is reset to equal the least unlabeled member of the "−1" subseries followed by further alternating and reciprocating resettings of β to equal the least unlabeled member of the "+1" and "−1" subseries. Each alternating resetting of β is immediately accompanied by the applicable "non-prime" labeling steps as described above.

The above described process of alternatingly setting and resetting β to equal the least unlabeled member of the "−1" subseries or the "+1" subseries, as the case may be, followed by the described "non-prime" labeling steps, may suitably continue until β equals n', with constant observation of the "non-prime" labeling steps. However, users of the inventive method will preferably observe that while $(\beta-((\beta+1)/6)$ is less than n', subsequent non-prime multiples of are generally present within the small numeric series, and that when $(\beta-((\beta+1)/6)$ equals or exceeds n'; subsequent non-prime multiples within the series are absent. Accordingly, the above described process of alternatingly setting and resetting β within the "−1" and "+1" subseries may be advantageously terminated when $(\beta-((\beta+1)/6)$ equals n'. At that point, every remaining unlabeled member of the small numeric series may be correctly labeled as "prime". Such early termination of the repetitive steps of the inventive method serves to further lessen computer processing time.

Technicians skilled in the computer programming arts will readily recognize that the method steps described above are amenable to computerized execution. An exemplary computer program for performing the instant inventive method appears in FIG. 5. The data input of such progress is a large positive integer n, and the output is a comprehensive list of prime integers less than or equal to n. The scope of the instant invention is intended to include and cover all computer executed modes and methods for performing the inventive method.

While the principles of the invention have been made clear in the above illustrative embodiment, those skilled in the art may make modifications in the method steps and modes of performing method steps of the invention without departing from those principles.

Accordingly, it is intended that the description and drawings be interpreted as illustrative and not in the limiting sense, and that the invention be given a scope commensurate with the appended claims.

I claim:

1. A method for determining prime numbers comprising computer performed steps of:
   (A) reducing the computer's processing time expended in determining the prime numbers by,
   (a) operating the computer to establish the numeric series, 6(1)−1, 6(1)+1, 6(2)−1, 6(2)+1, 6(3)−1, 6(3)+1, . . . 6(n)−1, 6(n)+1, each member of said series being initially unlabeled, said series comprising a "−1" subseries and a "+1" subseries;
   (b) further operating the computer to set β to equal the least unlabeled member of the "−1" subseries, to label that member as "prime", to label as "non-prime" every $\beta^{th}$ member thereafter of the "−1" subseries, to label as "nonprime" the $(\beta-((\beta+1)/6))^{th}$ element of the "+1" subseries, and to label as "non-prime" every $\beta^{th}$ member thereafter of the "+1" subseries;
   (c) further operating the computer to set β to equal the least unlabeled member of the "+1" subseries, to label that member as "prime", to label as "non-prime" every $\beta^{th}$ member thereafter of the "+1" subseries, to label as "nonprime" the $(\beta-(\beta-1)/6))^{th}$ member of the "−1" subseries, and to label as "non-prime" every $\beta^{th}$ element thereafter of the "−1" subseries; and
   (B) operating the computer to repeat steps (A)(b) and (A)(c) until each member of the numeric series is labeled.

2. A method for determining, for use in ciphers, all of the prime numbers within the large numeric series: 5, 6, 7, 8, 9, 10, 11, 12, . . . , n, the method comprising computer performed steps of:
   (A) reducing the computer's processing time expended in determining the prime numbers by,
   (a) operating the computer to set n'=⌈n/6;
   (b) further operating the computer to establish the small numeric series, 6(1)−1, 6(1)+1, 6(2)−1, 6(2)+1, 6(3)−1, 6(3)+1, . . . 6(n')−1, 6(n')+1, each member of said series being initially unlabeled, said series comprising a "−1" subseries and a 20 "+1" subseries;
   (c) further operating the computer so that, while $\beta-((\beta+1)/6)$ is less than n', repeating sub-steps of:
      (1) setting β to equal the least unlabeled member of the "−1" subseries, labeling that member as "prime", labeling as "non-prime" every $\beta^{th}$ member thereafter of the "−1" subseries, labeling as "non-prime" the $(\beta-((\beta+1)/6))^{th}$ member of the "+1" subseries, labeling as "non-prime" every $\beta^{th}$ member thereafter of the "+1" subseries, and
      (2) setting β to equal the least unlabeled member of the "+1" subseries, labeling that member as "prime", labeling as "non-prime" every $\beta^{th}$ member thereafter of the "+1" subseries, labeling as "non-prime" the $(\beta-((\beta-1)/6))^{th}$ member of the "−1" subseries, and labeling as "non-prime" every $\beta^{th}$ member thereafter of the "−1" subseries, are repeated by the computer; and
   (B) operating the computer to label as "prime" each unlabeled member of the small numeric series.

* * * * *